United States Patent [19]

Sanborn

[11] Patent Number: 5,076,870

[45] Date of Patent: Dec. 31, 1991

[54] CARPET AND METHOD OF ATTACHMENT

[76] Inventor: Kenneth R. Sanborn, 711 Trombley, Grosse Pointe Park, Mich. 48230

[21] Appl. No.: 382,256

[22] Filed: Jul. 19, 1989

[51] Int. Cl.$^5$ .............................................. B32B 31/16
[52] U.S. Cl. .................... 156/73.1; 156/152;
156/244.27; 156/309.9; 156/321; 156/322;
156/324.4; 296/39.1; 296/146; 428/95
[58] Field of Search ............. 428/95; 156/73.1, 309.9,
156/324.4, 244.27, 152, 322, 321; 296/39.1, 191,
146

[56] References Cited

U.S. PATENT DOCUMENTS

| | | | |
|---|---|---|---|
| 2,554,150 | 5/1951 | Moore | 156/152 |
| 3,014,829 | 12/1961 | Curtin . | |
| 3,577,581 | 5/1971 | Stata . | |
| 3,788,917 | 1/1974 | Linda | 156/322 |
| 4,123,577 | 10/1978 | Port et al. . | |
| 4,751,130 | 6/1988 | Grossmann et al. . | |
| 4,761,318 | 8/1988 | Ott et al. . | |

FOREIGN PATENT DOCUMENTS

| | | | |
|---|---|---|---|
| 2727285 | 1/1978 | Fed. Rep. of Germany | 156/244.27 |
| 62-227811 | 10/1987 | Japan | 296/39.1 |
| 1018370 | 1/1966 | United Kingdom | 156/73.1 |

*Primary Examiner*—John J. Gallagher
*Attorney, Agent, or Firm*—Krass & Young

[57] ABSTRACT

An improved carpet, an improved method of making a carpet, and an improved method of attaching a carpet to a motor vehicle door trim panel. The improved carpet comprises an outer woven polypropylene pile layer, an inner nonwoven polypropylene layer, and a central intermediate recycled rubber layer. The carpet is formed by extruding a melted mixture of rubber and polypropylene particles to form a hot central sheet and thereafter adhering a woven polypropylene layer to the upper face of the hot sheet and a nonwoven polypropylene layer to the lower face of the hot sheet. Carpet is attached to the lower portion of a door trim panel of a motor vehicle by heating the lower portion of the door trim panel with hot air until the panel is tacky and thereafter pressing the invention carpet downwardly against the tacky surface of the door trim panel to form a firm welded marriage as between the carpet and the panel. Alternatively, the marriage of the carpet and panel may be achieved by ultrasonic energy applied through the door trim panel to the interface between the door trim panel and the carpet.

11 Claims, 3 Drawing Sheets

U.S. Patent        Dec. 31, 1991        Sheet 1 of 3        5,076,870
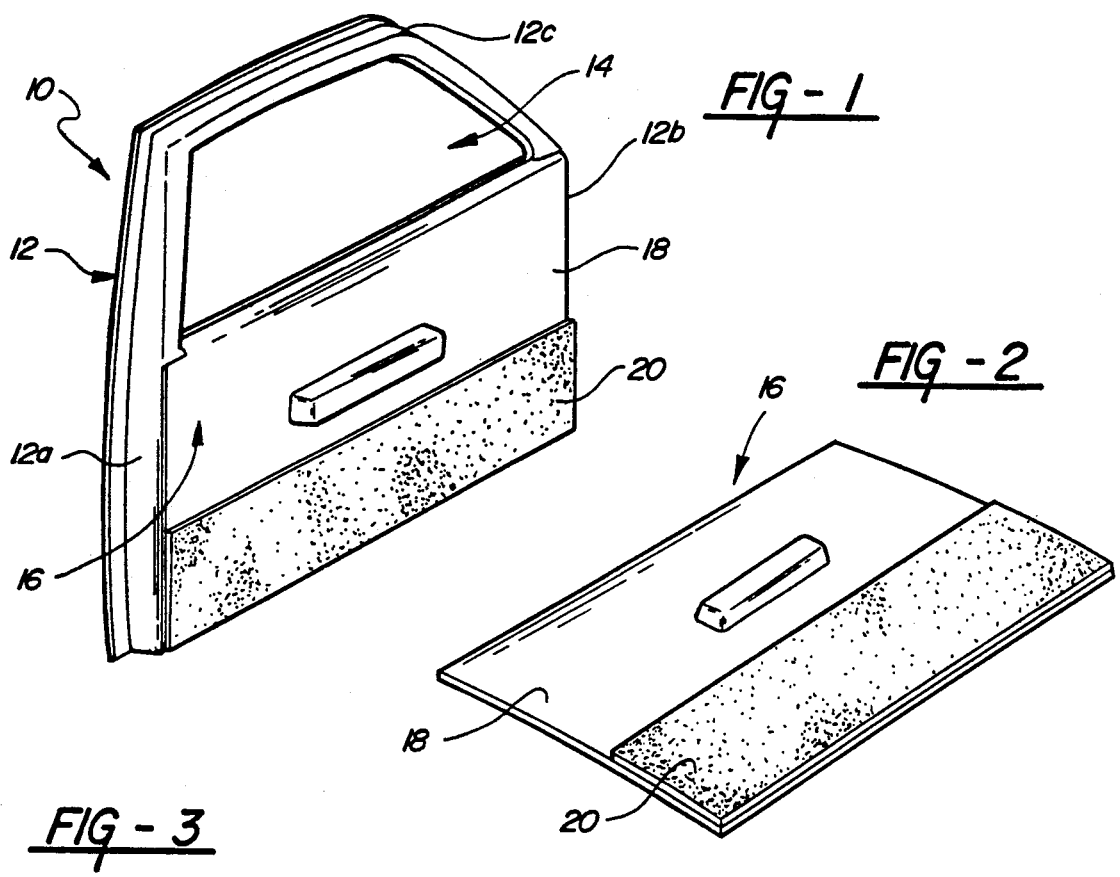
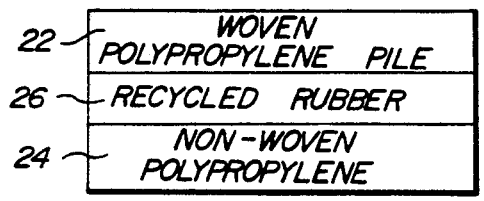
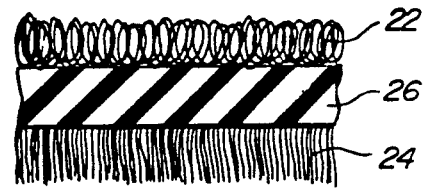
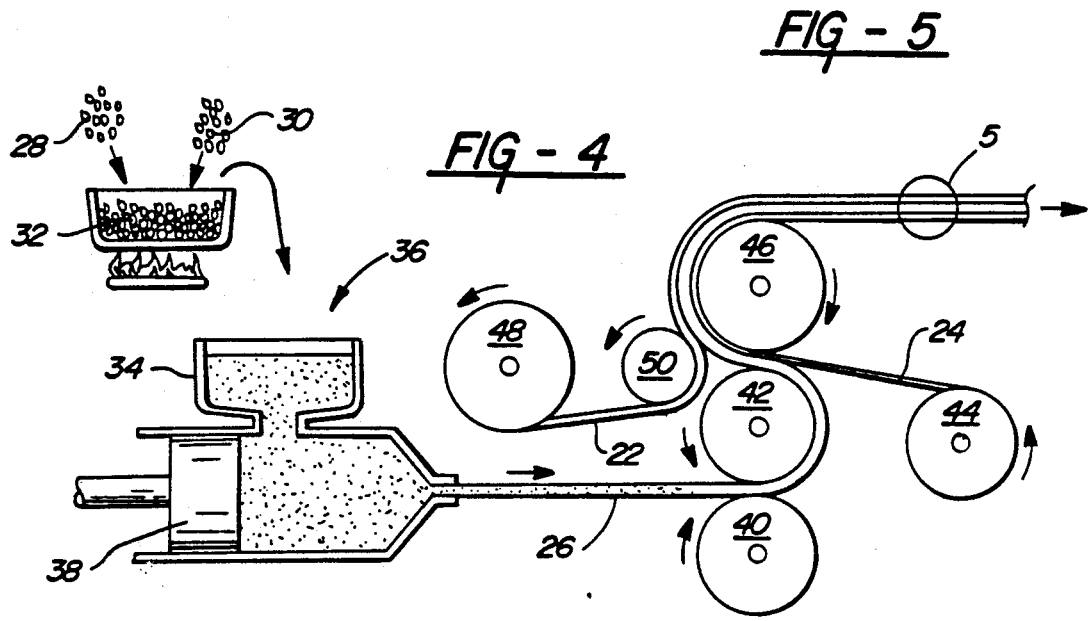

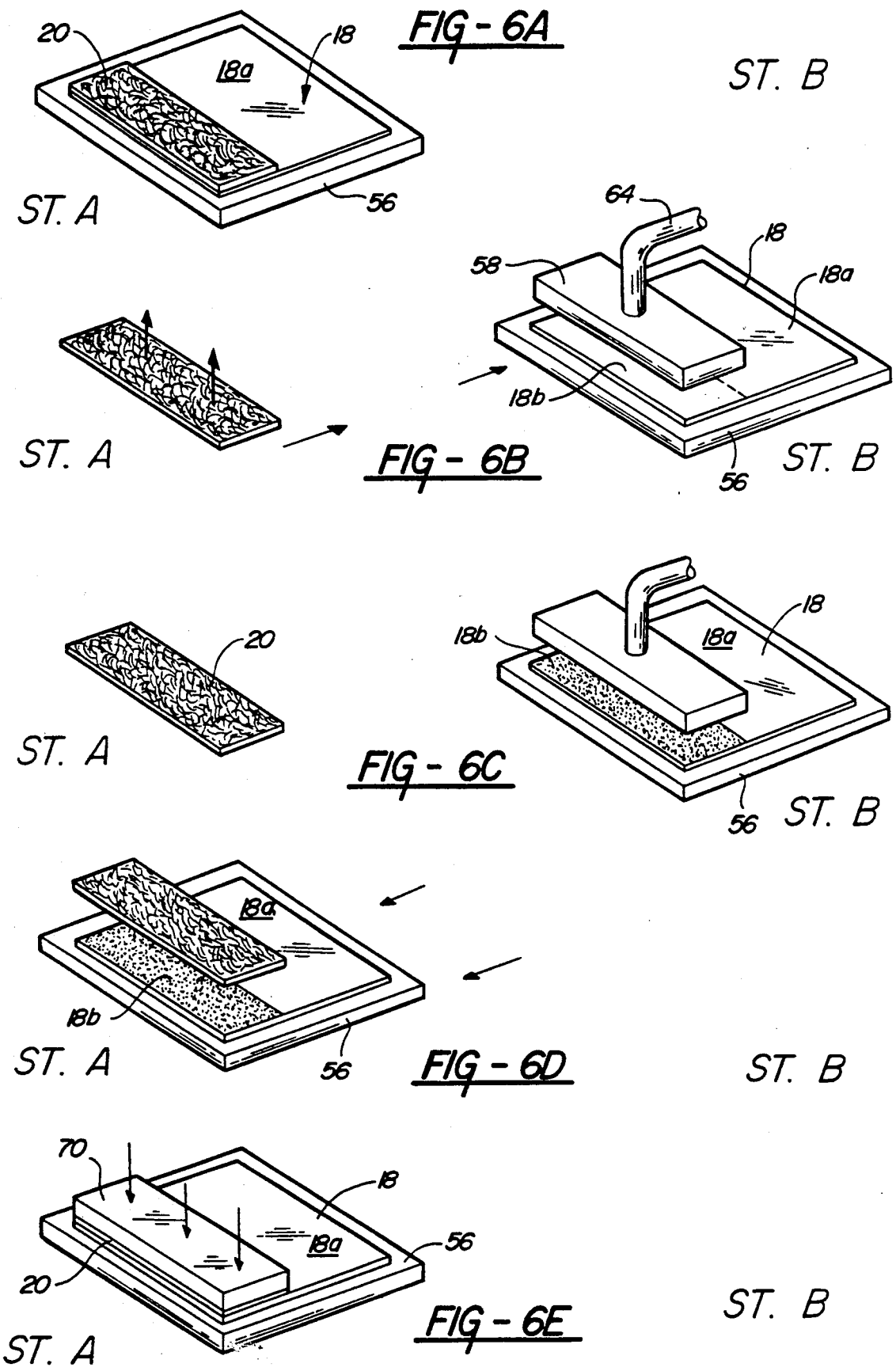

CARPET AND METHOD OF ATTACHMENT

This invention relates to fabrics and more specifically to fabrics employed in trim applications for motor vehicles, particularly carpeting intended to be attached to the lower surface of door trim panels.

Trim or decorative fabrics are utilized in many locations in modern day passenger car motor vehicles. For example, carpeting is applied to the floor of the vehicle in the front and/or rear passenger compartment; carpeting is utilized to cover the floor of the trunk; and carpeting is attached to the lower portions of the door trim panels. In each of these applications, it is imperative that the carpet be applied to the substrate panel in an inexpensive and effective manner consistent with modern day motor vehicle mass assembly procedures and it is further extremely important that the carpeting remain affixed to the underlying substrate panel even in extreme conditions of temperature and wear and even over-extended periods of usage. Prior art methods of attaching carpet trim to interior substrate panels of motor vehicles include the use of glues, the use of staples, the use of a pressure sensitive backing for the carpet, and the use of sonic welding techniques. Each of these prior art techniques or methods present problems. The use of glues is labor intensive, is done at the risk of excess glue contaminating other areas of the motor vehicle, creates environmental problems including the need to dispose of the empty glue cans and the need to use solvents to clean the gluing equipment, and creates warranty problems since the glued carpeting often comes loose from the substrate panel under conditions of hard usage and/or extreme temperature conditions. The use of staples is labor intensive, is unsightly since the staples often show and detract from the aesthetics of the final carpet assembly, can result in weakening or even fracturing of the substrate panel, and creates warranty problems since the staples often work loose under extreme conditions with resultant loosening of the carpeting. The use of a pressure sensitive backing on the carpeting adds significantly to the cost of the carpet and creates significant warranty problems since the pressure sensitive backing cannot tolerate extreme usage or temperature conditions. The use of sonic welding techniques creates aesthetic problems since the sonic welding often produces burn spots on the carpeting.

SUMMARY OF THE INVENTION

This invention is directed to the provision of an improved decorative fabric, and an improved method of attaching the decorative fabric to a substrate panel.

More specifically, this invention is directed to the provision of an improved method of attaching a carpet fabric to substrate surfaces in motor vehicles.

Yet more specifically, this invention is directed to the provision of an improved method of attaching carpet strips to the lower portions of door trim panels in motor vehicles.

The invention broadly provides a method of providing a substrate panel and fabric assembly. According to the invention method, a rigid substrate panel is provided formed of a fusible material; a fabric member is provided having an aesthetic material layer on one surface thereof and a heat fusible backing material layer at another surface thereof; the fabric member is positioned proximate the substrate panel with the heat fusible surface of the fabric member juxtaposed to one surface of the substrate panel; heat is provided at the interface of the substrate panel and the fabric member sufficient to fuse the backing material on the fabric and the material of the panel at their interface; and the fabric member is pressed against the substrate panel to fuse the fabric member to the panel and form the substrate panel and fabric assembly. This basic methodology provides an inexpensive and effective way of attaching the fabric to the substrate.

According to a further feature of the invention methodology, the heat providing step comprises applying heat to the one surface of the panel to render the one surface tacky and thereafter positioning the fabric member proximate the panel with the heat fusible surface of the fabric member juxtaposed to the one surface of the substrate panel, and the pressing step comprises pressing the fabric member against the tacky surface of the panel. This simple methodology provides a solid fusion as between the fabric member and the substrate panel.

According to a further feature of the invention methodology, a third layer is provided for the fabric member comprising an elastomeric material layer positioned in sandwich fashion between the aesthetic material layer and the backing material layer. This intermediate layer of elastomeric material facilitates the attachment of the aesthetic layer to the backing material layer and facilitates the fusion process.

In the disclosed embodiment of the invention, the backing material comprises a nonwoven polypropylene material. The nonwoven polypropylene material readily fuses and readily bonds to the confronting surface of the substrate panel.

According to a further aspect of the invention methodology, the fabric member is a carpet member; the carpet member is placed against the substrate panel; the carpet member is moved to a position removed from the panel; an area of the panel is locally heated; the carpet member is returned to a position contiguous to the heated area of the panel; and the carpet member is pressed against the panel to fuse the carpet member to the panel at their interface. This specific handling of the panel and carpet allows the attachment process to be performed with a minimum of labor and in a minimum time frame.

According to a further aspect of the invention methodology, the panel is heated by the application of hot air to the local portion of the panel. This specific heating arrangement facilitates the inexpensive heating of the panel to accomplish the fusion operation as between the carpet member and the panel.

According to another, alternate aspect of the invention methodology, the heat is provided at the interface of the substrate panel and the carpet member by delivering sonic energy to the interface so as to generate heat by the vibration of the carpet material and the confronting material of the panel.

The invention also provides a method of forming a laminar fabric such as a carpet. According to this aspect of the invention method, a heated fused mixture of material is provided; the heated mixture is extruded to form a hot layer or sheet of material; and a layer of carpeting material is applied to one surface of the hot layer of material. This arrangement provides an inexpensive and effective means of providing a carpet especially suitable for attachment to a substrate.

According to a further feature of the carpet forming method, a second layer of carpet is applied to the other surface of the hot layer to form a sandwich structure for the carpet.

In the disclosed embodiment of this aspect of the invention, the mixture of material forming the hot layer comprises a mixture of rubber particles and polypropylene particles, one layer of carpeting material comprises a pile layer of woven polypropylene material, and the other layer of carpeting material comprises a layer of nonwoven polypropylene material.

The invention also provides a novel carpet structure. The carpet structure according to the invention comprises an upper pile layer of woven polypropylene material; an intermediate layer of elastomeric material; and a lower layer of nonwoven polypropylene material. This particular carpet construction provides a carpet that is particularly amenable to attachment to a substrate.

BRIEF DESCRIPTION OF THE DRAWINGS

FIG. 1 is a perspective simplified view of a door assembly of a motor vehicle;

FIG. 2 is a perspective view of a door trim panel assembly utilized in the door assembly of FIG. 1;

FIG. 3 is a schematic view of the composition of a carpet member utilized in the door trim panel assembly of FIG. 2;

FIG. 4 is a schematic view showing a method of forming a carpet member of the type shown schematically in FIG. 3;

FIG. 5 is a cross-sectional view taken within the circle 5 of FIG. 4

FIG. 6 is a schematic perspective view showing a method of forming the trim panel assembly of FIG. 2;

DETAILED DESCRIPTION OF THE PREFERRED EMBODIMENTS

Figure 10:
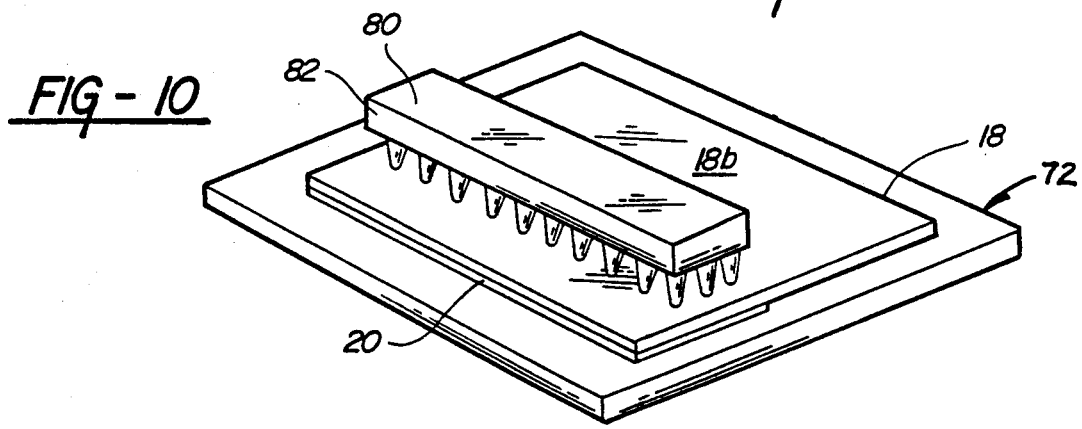
FIGS. 10-13 disclose an alternate method of forming the door trim panel of FIG. 2.
Figure 11:
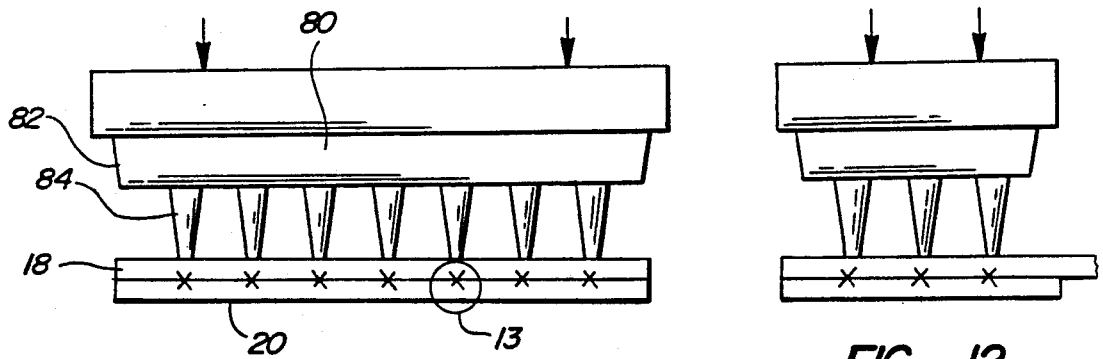
Figure 12:
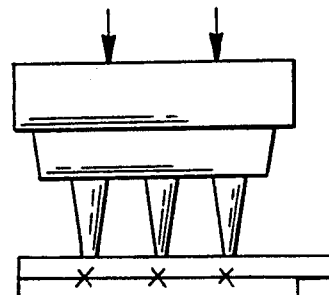
Figure 13:
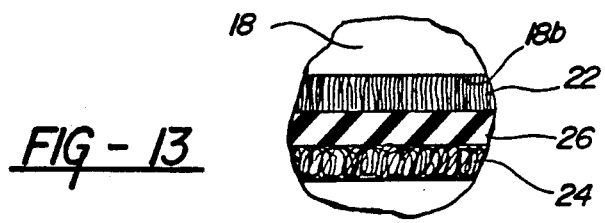

The motor vehicle door assembly shown in FIG. 10 includes a metal frame structure 12, a window 14, and a trim panel assembly 16.

Frame 12 includes a shut face 12a, a hinge face 12b, and an upper window frame portion 12c framing window 14.

Window 14 is positioned in its raised position within window frame portion 12c and is lowerable in known manner by a crank mechanism (not shown) to a stowed position within door frame 12.

Door trim panel assembly 16 includes a door trim panel 18 and a fabric member such as a carpet strip 20 secured to the lower portion of the door trim panel.

Door trim panel 18 has a size, shape and configuration varying with the particular motor vehicle with which it is associated and in general covers the area of the door frame 12 on the inside of the motor vehicle below the opening defined by the window frame portion 12c. Trim panel 18 is preferably formed of a polypropylene material but may also be formed of other materials such for example as ABS plastic.

Carpet strip 20 includes an outer aesthetic material layer such as a pile layer 22, a heat fusible inner backing layer 24, and an intermediate backing layer 26. Outer pile layer 22 is preferably formed of a woven polypropylene material; inner backing layer 24 is preferably formed of a nonwoven polypropylene material; and intermediate layer 26 is preferably formed of an elastomeric material such for example as a mixture of fused rubber particles and polypropylene particles. Recycled rubber is particularly suitable for use in forming intermediate layer 26.

As seen schematically in FIG. 4, carpet strip 20 may be formed by mixing a supply of polypropylene pellets or powder 28 and a supply of recycled rubber pellets or powder 30 in a container 32, heating the container to form a fused melted mixture of polypropylene and rubber, supplying the fused mixture to the hopper 34 of an extruder 36, extruding a sheet or hot layer 26 from the extruder 36 by the use of an extruder piston 38, passing the hot layer 26 through heated nipper rollers 40,42 and thereafter upwardly around roller 42, unrolling a layer or sheet of nonwoven polypropylene material 24 from a roll of nonwoven polypropylene material 44 and passing the sheet 24 between nipper roller 42 and a further nipper roller 46 to press the sheet 24 into the hot and fusible under face of layer 26, and passing a sheet or layer 22 of woven polypropylene material from a roll 48 of woven polypropylene material around a pressure roll 50 and into contact with the upper face of layer 38 to bond the sheet 22 to the hot fused upper face of layer 26 so as to form the sandwich or laminar carpet structure shown schematically in FIG. 3 and shown structurally in FIG. 5.

As seen in FIG. 5, the invention carpet strip 20, as formed by the method of FIG. 4, includes a fused laminar structure in which the melted fibers of the woven polypropylene layer 22 have fused into the hot elastomeric layer 26 and the fused or melted fibers of nonwoven polypropylene layer 24 have fused into the lower face of the hot elastomeric layer 26 to form the carpet strip 20. The carpet 20 thus formed is secured to the door trim panel 18 by the method seen schematically in FIG. 6.

In the method of forming a trim panel assembly shown in FIG. 6, the door trim panel 18 is preferably formed of a polypropylene material In FIG. 6a, door trim panel 18 is shown supported on a fixture or nest 56 located at a first work station A and a carpet strip 20 is positioned on the upper or outer face 18a of the door trim panel.

In FIG. 6b, carpet strip 20 has been suitably raised above the level of the door trim panel 18 (as for example by the use of a suction device) and the nest 56, carrying door trim panel 18, has been suitably shuttled (by a mechanism not shown) to a second work station B where the lower portion 18b of the upper surface 18a of the door trim panel underlies a hot air heating device 58.

Figure 7:
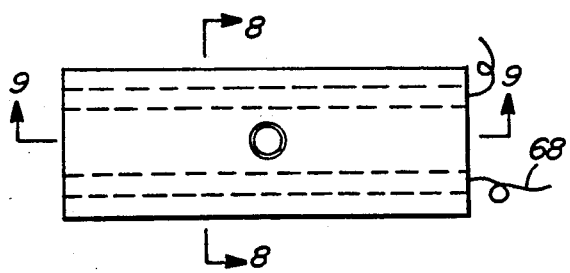
FIGS. 7-9 are detailed views of a heating device employed in the method of FIG. 6.
Figure 8:
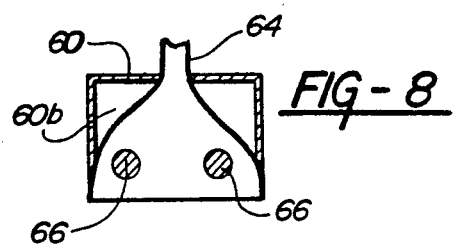
Figure 9:
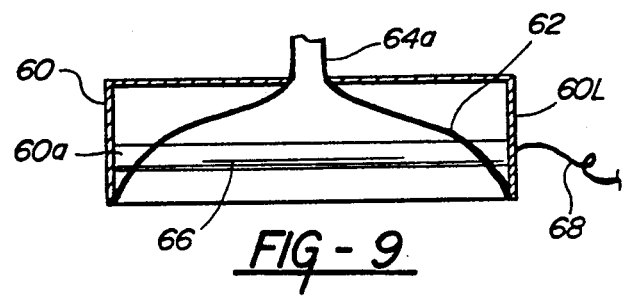

Hot air heating device 58, as best seen in FIGS. 7-9, includes an outer frame structure 60 of generally rectangular construction open at its lower end; a hood 62 positioned within the outer frame 60; a conduit 64 connected to a suitable source of air and opening at its lower end 64a at the upper end of hood 62; two or more rods 66 extending in parallel fashion between frame end wall 60a and 60b and passing through hood 62; and leads 68 suitably connected to rods 66 so as to heat the rods in known manner. Rods 66 may for example be of the Kalrod type available from Tempco Inc. of Woodale, Ill. It will be understood that air delivered through conduit 64 passes downwardly over heated rods 66 so as to provide a supply of heated air at the open lower end of hood 62.

As seen in FIG. 6c, the heated air emerging from the open lower end of hood 62 of heater 58 impinges on the upper face 18a of trim panel 18 in the lower region 18b of the panel so as to locally heat the panel over the area 18b and produce a tacky, fused surface condition over the local area 18b, whereafter, as seen in FIG. 6d, the nest 56 and panel 18 carried thereby are returned to work station A to position panel 18 in a position directly underlying carpet strip 20, whereafter, as seen in FIG. 6e, the carpet strip 20 is lowered to a position where its underface is in juxtaposition to the tacky surface 18b of the panel, whereafter a suitable platen 70 is moved into position over the carpet to press the carpet downwardly against the tacky surface 18b of the panel. As the carpet is pressed against the hot tacky surface 18b, fibers of the nonwoven polypropylene layer 24 are heated by the heat from the tacky surface of the panel, fuse together, and melt or blend into the tacky surface 18b of the panel to form a solid, fused weld as between the carpet and the panel consisting of melted fibers of carpet layers 24 and 26 and melted fibers of the polypropylene panel 18.

An alternate method for attaching carpet strips to door trim panels is shown in FIGS. 10-13. The method of FIGS. 10-13 is especially suitable for use with door trim panels of the type formed of ABS plastic material.

In the method seen in FIGS. 10-13, carpet strip 20 is suitably supported on a nest or fixture 72 with nonwoven layer 22 uppermost; door trim panel 18 is positioned over carpet strip 20 with surface panel contiguous to carpet nonwoven layer 22; and a sonic welding head 80 is suitably positioned over the lower portion of panel 18.

Welding head 80 includes a main frame portion 82 and a plurality of horns 84 projecting downwardly from main frame 82 for engagement with the rear face of the door trim panel 18 at longitudinally and laterally spaced locations so as to form a matrix with respect to the lower portion of the door trim panel. Sonic welder 80 is suitably energized in known manner to vibrate the horns 84 and the horns 84 operate through panel 18 to create vibration at respective local locations at the interface between the carpet 20 and the panel 18 so as to heat the panel 18 and the carpet 20 at the local vibration points and fuse the carpet to the panel at these points. Specifically, the vibration at the local interface points has the effect of melting the material of elastomeric intermediate layer 26, fusing the fibers of nonwoven polypropylene layer 24 into elastomeric layer 26, fusing the material of panel 18, and fusing the intermixed material of layers 24 and 26 in a welding manner to the fused surface of panel 18 to form a tight, irrevocably sonic marriage as between the carpet 20 and the panel 18.

The invention will be seen to provide an improved carpet assembly, an improved method for forming a carpet assembly, and an improved method of attaching a carpet strip to a door trim panel of a motor vehicle in a manner to avoid aesthetic marring of the carpet strip and yet provide a firm welded attachment of the strip to the panel that will endure sustained heavy usage as well as temperature extremes.

Whereas preferred embodiments of the invention have been illustrated and described in detail, it will be apparent that various changes may be made in the disclosed embodiments without departing from the scope or spirit of the invention.

I claim:

1. A method of providing a substrate panel and fabric assembly comprising the steps of:
    providing a rigid substrate panel formed of a fusible material;
    providing a fabric member having an aesthetic material layer at one surface thereof and a heat fusible non-woven backing material layer at another surface thereof;
    positioning said fabric member proximate said substrate panel with said other surface of said fabric member juxtaposed to one surface of said substrate panel;
    providing heat at the interface of said substrate panel and said fabric member sufficient to fuse said backing material and said panel at said interface; and
    pressing said fabric member against said substrate panel to fuse said fabric member to said panel and form a substrate panel and fabric assembly comprising the substrate panel with the fabric member fused thereto with the aesthetic material layer exposed and the heat fusible non-woven backing material sandwiched between the substrate panel and the aesthetic material layer.

2. A method according to claim 1 wherein:
    said heat providing step comprises applying heat to said one surface of said panel to render said one surface tacky and thereafter positioning said fabric member proximate said panel with said other surface of said fabric member juxtaposed to said one surface of said substrate panel; and
    said pressing step comprises pressing said fabric against said tacky surface of said panel.

3. A method according to claim 1 wherein:
    said heat providing step comprises delivering sonic energy to said interface.

4. A method according to claim 1 wherein said method includes the further step of:
    F) providing a layer of elastomeric material positioned in sandwich fashion between said aesthetic material layer and said non-woven material layer.

5. A method according to claim 4 wherein:
    said non-woven material layer comprises a nonwoven polypropylene material.

6. A method according to claim 1 wherein said fabric member further includes an elastomeric backing material intermediate the aesthetic material layer and the non-woven backing material layer to facilitate the fusion of the fabric member to the substrate panel.

7. A method according to claim 6 wherein:
    the aesthetic material layer of said fabric member comprises a woven material.

8. A method according to claim 2 wherein:
    said heat providing step comprises blowing hot air onto said one surface of said panel.

9. A method of attaching a carpet strip to a motor vehicle trim panel formed of a fusible material, said method comprising the steps of:
    providing a carpet strip including a woven material layer on the outer surface thereof and a heat fusible material layer on the inner surface thereof;
    positioning the carpet strip proximate the trim panel with said heat fusible layer juxtaposed to one face of the trim panel;
    providing heat at the interface of the carpet strip and the trim panel sufficient to fuse said one face of the trim panel and the heat fusible material layer on said surface of the carpet strip; and
    pressing the carpet strip against the trim panel to fuse the carpet strip to the trim panel with the outer woven material layer exposed and the heat fusible layer sandwiched between the trim panel and the outer woven material layer.

10. A method according to claim 9 wherein:
said heat providing step comprises applying heat to the upper face of the trim panel to render that surface tacky and thereafter positioning the carpet strip proximate the trim panel with the underface of the heat fusible layer of the carpet strip juxtaposed to the upper face of the trim panel; and
said pressing step comprises pressing the carpet strip against the tacky upper face of the trim panel.

11. A method according to claim 10 wherein: prior to said positioning step the carpet strip is positioned proximate the door trim panel at a first work station, the carpet strip is moved away from the door trim panel, the door trim panel is shuttled to another work station where heat is applied to one face of the door trim panel, and the heated door trim panel is returned to the first work station where said positioning step is performed by moving the carpet strip against the heated surface of the door trim panel whereafter said pressing step is performed.

* * * * *